United States Patent
Doddaiah et al.

(10) Patent No.: US 12,282,656 B1
(45) Date of Patent: Apr. 22, 2025

(54) OPTIMAL MEMORY SLOT SIZE SELECTION FOR RANDOM READ MISS IO OPERATIONS

(71) Applicant: Dell Products, L.P., Hopkinton, MA (US)

(72) Inventors: Ramesh Doddaiah, Westborough, MA (US); Kaustubh Sahasrabudhe, Westborough, MA (US); Malak Alshawabkeh, Franklin, MA (US)

(73) Assignee: Dell Products, L.P., Hopkinton, MA (US)

( * ) Notice: Subject to any disclaimer, the term of this patent is extended or adjusted under 35 U.S.C. 154(b) by 0 days.

(21) Appl. No.: 18/402,864

(22) Filed: Jan. 3, 2024

(51) Int. Cl.
*G06F 3/06* (2006.01)

(52) U.S. Cl.
CPC .......... *G06F 3/061* (2013.01); *G06F 3/0655* (2013.01); *G06F 3/0679* (2013.01)

(58) Field of Classification Search
CPC ....... G06F 3/061; G06F 3/0679; G06F 3/0655
See application file for complete search history.

(56) References Cited

U.S. PATENT DOCUMENTS

| | | | | |
|---|---|---|---|---|
| 7,822,731 B1 * | 10/2010 | Yu | ....... | G06F 12/0862 |
| | | | | 711/111 |
| 2015/0120994 A1 * | 4/2015 | Uttamchandani | ..... | G06F 3/0667 |
| | | | | 711/103 |

* cited by examiner

*Primary Examiner* — Jane W Benner
(74) *Attorney, Agent, or Firm* — Anderson Gorecki LLP

(57) ABSTRACT

A random read miss slot size selection engine is configured to select between multiple memory slot sizes to optimize slot size allocations for random read miss IO operations. Upon receipt of an IO operation that is a random read miss IO operation, the slot size selection engine obtains a metadata page encompassing multiple entries in addition to an entry associated with the random read miss IO operation. The slot size selection engine performs a metadata temporal analysis to analyze temporal information associated with previous slot allocations identified in the metadata page. The slot size selection engine also performs a metadata spatial analysis to spatially analyze previous slot allocations to neighboring tracks identified in the metadata page. In response to a determination that the metadata page contains a threshold number of recent slot allocations, the spatial analysis is used to determine the slot size to allocate to the random read miss.

20 Claims, 7 Drawing Sheets

| | Storage Engine 1 (118₁) | | Storage Engine 2 (118₂) | |
|---|---|---|---|---|
| | Compute Node 0 (116₀) | Compute Node 1 (116₁) | Compute Node 2 (116₂) | Compute Node 3 (116₃) |
| TID1 305₁ | 8K  310 | 16K  310 | 16K  310 | 8K  310 |
| TID2 305₂ | 16K | 16K | 16K | 16K |
| TID3 305₃ | 64K | 8K | 16K | 16K |
| TID4 305₄ | 64K | 64K | 64K | 64K |
| TID5 305₅ | 8K | 16K | 16K | 64K |
| ... | ... | ... | ... | ... |
| TID42 305₄₂ | 16K | 16K | 16K | 16K |

MetaData Page 300

Legend:  Write IO     Read IO

OPTIMAL MEMORY SLOT SIZE SELECTION FOR RANDOM READ MISS IO OPERATIONS

FIELD

This disclosure relates to computing systems and related devices and methods, and, more particularly, to a method and apparatus for selecting between multiple memory slot sizes to optimize slot size allocations for random read miss IO operations.

SUMMARY

The following Summary and the Abstract set forth at the end of this document are provided herein to introduce some concepts discussed in the Detailed Description below. The Summary and Abstract sections are not comprehensive and are not intended to delineate the scope of protectable subject matter, which is set forth by the claims presented below.

All examples and features mentioned below can be combined in any technically possible way.

In some embodiments, a random read miss slot size selection engine is configured to select between multiple memory slot sizes to optimize slot size allocations for random read miss IO operations. Upon receipt of an IO operation that is a random read miss IO operation, the slot size selection engine obtains a metadata page containing entries encompassing multiple neighboring tracks in addition to an entry for a track associated with the random read miss IO operation. The slot size selection engine performs a metadata temporal analysis to analyze temporal information associated with previous slot allocations to neighboring tracks identified in the metadata page. The slot size selection engine also performs a metadata spatial analysis, for example using a process such as collaborative filtering, to spatially analyze previous slot allocations to neighboring tracks identified in the metadata page. Based on the temporal analysis, in response to a determination that the metadata page contains a threshold number of recent slot allocations, the spatial analysis is used to determine the slot size to allocate to the random read miss IO operation. Based on the temporal analysis, in response to a determination that the metadata page does not contains a threshold number of recent slot allocations, a size of the read IO is used instead of the spatial analysis to determine a slot size to allocate to the random read miss.

In some embodiments, a method of selecting between multiple memory slot sizes of global memory for random read miss IO operations, includes receiving an IO operation on a first track of storage, determining that the IO operation is a random read miss IO operation, in which data requested in connection with the IO operation is not currently contained in an allocated slot of global memory, and retrieving a metadata page containing metadata, the metadata identifying previous slot allocations for read IO operations on a range of tracks of storage, the range of tracks of storage including the first track of storage. The method also includes performing a spatial metadata analysis on the metadata contained in the metadata page to generate a slot size recommendation, and performing a temporal metadata analysis on the metadata contained in the metadata page to determine if the metadata contained in the metadata page is hot. In response to a determination that the metadata contained in the metadata page is hot, allocating a slot to the received IO operation based on the slot size recommendation determined by the spatial metadata analysis. In response to a determination that the metadata contained in the metadata page is not hot, allocating a slot to the received IO operation based on a size of data requested by the received IO operation.

In some embodiments, the range of tracks of storage is a continuous range of tracks of physical storage.

In some embodiments, the range of tracks of storage is a group of tracks of physical storage corresponding to a range of tracks of a logical storage volume.

In some embodiments, the metadata page further includes information identifying previous slot allocations for write IO operations on the range of tracks of storage, and the spatial metadata analysis includes creating a utility matrix from the metadata page, the utility matrix including entries only for the slot allocations associated with the read IO operations and does not include entries for slot allocations for the write IO operations.

In some embodiments, each entry of the utility matrix includes a track ID of a corresponding track and a slot size indication identifying a size of a slot that was allocated to implement the read IO on the corresponding track. In some embodiments, the spatial metadata analysis further includes implementing a collaborative filtering process on the utility matrix to identify a most frequently used slot size. In some embodiments, the slot size recommendation determined by the spatial metadata analysis is the larger of a size of the read IO operation or the most frequently used slot size determined by the collaborative filtering process. In some embodiments, the spatial metadata analysis is implemented in response to a determination that the metadata contained in the metadata page is hot.

In some embodiments, the temporal metadata analysis includes obtaining timestamps from the global memory for a plurality of slots identified in the metadata page that were used to implement read IO operations, and comparing the timestamps with temporal and frequency thresholds to determine if the metadata contained in the metadata page is hot. In some embodiments, the temporal threshold specifies a preceding point in time relative to a current time, and the frequency threshold specifies a number of timestamps that are required to be more recent than the temporal threshold for the metadata contained in the metadata page to be deemed to be hot.

In some embodiments, a random read miss slot size selection engine, includes one or more processors and one or more storage devices storing instructions that are operable, when executed by the one or more processors, to cause the one or more processors to perform operations including receiving an IO operation on a first track of storage, determining that the IO operation is a random read miss IO operation, in which data requested in connection with the IO operation is not currently contained in an allocated slot of global memory, and retrieving a metadata page containing metadata, the metadata identifying previous slot allocations for read IO operations on a range of tracks of storage, the range of tracks of storage including the first track of storage. The operations also include performing a spatial metadata analysis on the metadata contained in the metadata page to generate a slot size recommendation, and performing a temporal metadata analysis on the metadata contained in the metadata page to determine if the metadata contained in the metadata page is hot.

In response to a determination that the metadata contained in the metadata page is hot, allocating a slot to the received IO operation based on the slot size recommendation determined by the spatial metadata analysis. In response to a determination that the metadata contained in the metadata page is not hot, allocating a slot to the received IO operation based on a size of data requested by the received IO operation.

In some embodiments, the range of tracks of storage is a continuous range of tracks of physical storage.

In some embodiments, the range of tracks of storage is a group of tracks of physical storage corresponding to a range of tracks of a logical storage volume.

In some embodiments, the metadata page further includes information identifying previous slot allocations for write IO operations on the range of tracks of storage, and the spatial metadata analysis includes creating a utility matrix from the metadata page, the utility matrix including entries only for the slot allocations associated with the read IO operations and does not include entries for slot allocations for the write IO operations. In some embodiments, each entry of the utility matrix includes a track ID of a corresponding track and a slot size indication identifying a size of a slot that was allocated to implement the read IO on the corresponding track. In some embodiments, the spatial metadata analysis further includes implementing a collaborative filtering process on the utility matrix to identify a most frequently used slot size. In some embodiments, the slot size recommendation determined by the spatial metadata analysis is the larger of a size of the read IO operation or the most frequently used slot size determined by the collaborative filtering process.

In some embodiments, the spatial metadata analysis is implemented in response to a determination that the metadata contained in the metadata page is hot.

In some embodiments, the temporal metadata analysis includes obtaining timestamps from the global memory for a plurality of slots identified in the metadata page that were used to implement read IO operations, and comparing the timestamps with temporal and frequency thresholds to determine if the metadata contained in the metadata page is hot. In some embodiments, the temporal threshold specifies a preceding point in time relative to a current time, and the frequency threshold specifies a number of timestamps that are required to be more recent than the temporal threshold for the metadata contained in the metadata page to be deemed to be hot.

DETAILED DESCRIPTION

Aspects of the inventive concepts will be described as being implemented in a storage system 100 connected to a host computer 102. Such implementations should not be viewed as limiting. Those of ordinary skill in the art will recognize that there are a wide variety of implementations of the inventive concepts in view of the teachings of the present disclosure.

Some aspects, features and implementations described herein may include machines such as computers, electronic components, optical components, and processes such as computer-implemented procedures and steps. It will be apparent to those of ordinary skill in the art that the computer-implemented procedures and steps may be stored as computer-executable instructions on a non-transitory tangible computer-readable medium. Furthermore, it will be understood by those of ordinary skill in the art that the computer-executable instructions may be executed on a variety of tangible processor devices, i.e., physical hardware. For ease of exposition, not every step, device or component that may be part of a computer or data storage system is described herein. Those of ordinary skill in the art will recognize such steps, devices, and components in view of the teachings of the present disclosure and the knowledge generally available to those of ordinary skill in the art. The corresponding machines and processes are therefore enabled and within the scope of the disclosure.

The terminology used in this disclosure is intended to be interpreted broadly within the limits of subject matter eligibility. The terms "logical" and "virtual" are used to refer to features that are abstractions of other features, e.g., and without limitation, abstractions of tangible features. The term "physical" is used to refer to tangible features, including but not limited to electronic hardware. For example, multiple virtual computing devices could operate simultaneously on one physical computing device. The term "logic" is used to refer to special purpose physical circuit elements, firmware, and/or software implemented by computer instructions that are stored on a non-transitory tangible computer-readable medium and implemented by multi-purpose tangible processors, and any combinations thereof.

Figure 1:
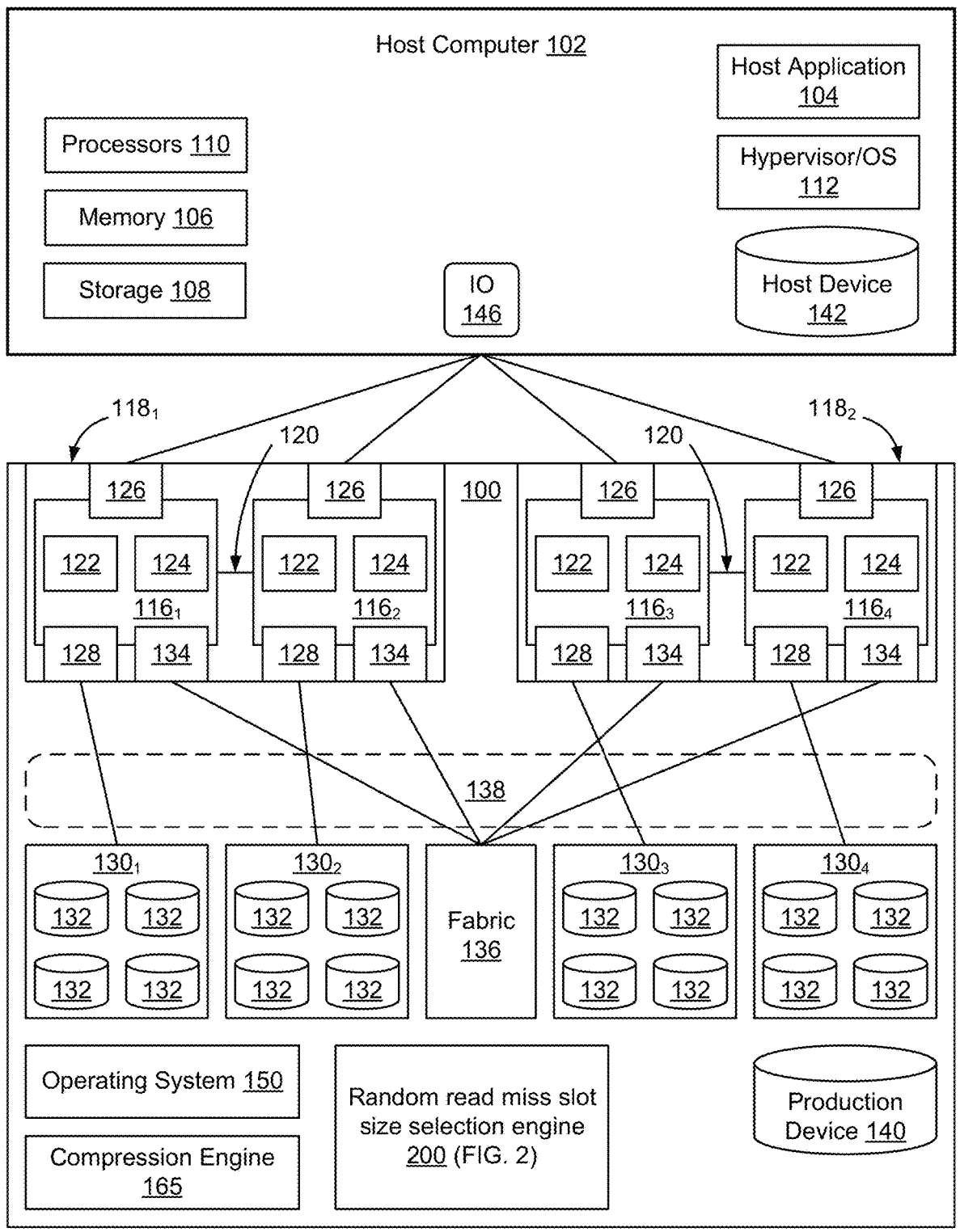
FIG. 1 is a functional block diagram of an example storage system connected to a host computer, the storage system having a random read miss slot size selection engine, according to some embodiments.

FIG. 1 illustrates a storage system 100 and an associated host computer 102, of which there may be many. The storage system 100 provides data storage services for a host application 104, of which there may be more than one instance and type running on the host computer 102. In the illustrated example, the host computer 102 is a server with host volatile memory 106, persistent storage 108, one or more tangible processors 110, and a hypervisor or OS (Operating System) 112. The processors 110 may include one or more multi-core processors that include multiple CPUs (Central Processing Units), GPUs (Graphics Processing Units), and combinations thereof. The host volatile memory 106 may include RAM (Random Access Memory) of any type. The persistent storage 108 may include tangible persistent storage components of one or more technology types, for example and without limitation SSDs (Solid State Drives) and HDDs (Hard Disk Drives) of any type, including but not limited to SCM (Storage Class Memory), EFDs (Enterprise Flash Drives), SATA (Serial Advanced Technology Attachment) drives, and FC (Fibre Channel) drives. The host computer 102 might support multiple virtual hosts running on virtual machines or containers. Although an external host computer 102 is illustrated in FIG. 1, in some embodiments host computer 102 may be implemented as a virtual machine within storage system 100.

The storage system 100 includes a plurality of compute nodes $116_1$-$116_4$, possibly including but not limited to storage servers and specially designed compute engines or storage directors for providing data storage services. In some embodiments, pairs of the compute nodes, e.g. ($116_1$-$116_2$) and ($116_3$-$116_4$), are organized as storage engines $118_1$ and $118_2$, respectively, for purposes of facilitating failover between compute nodes 116 within storage system 100. In some embodiments, the paired compute nodes 116 of each storage engine 118 are directly interconnected by communication links 120. In some embodiments, the communication links 120 are implemented as a PCIe NTB. As used herein, the term "storage engine" will refer to a storage engine, such as storage engines $118_1$ and $118_2$, which has a pair of (two independent) compute nodes, e.g. ($116_1$-$116_2$) or ($116_3$-$116_4$). A given storage engine 118 is implemented using a single physical enclosure and provides a logical separation between itself and other storage engines 118 of the storage system 100. A given storage system 100 may include one storage engine 118 or multiple storage engines 118.

Each compute node, $116_1$, $116_2$, $116_3$, $116_4$, includes processors 122 and a local volatile memory 124. The processors 122 may include a plurality of multi-core processors of one or more types, e.g., including multiple CPUs, GPUs, and combinations thereof. The local volatile memory 124 may include, for example and without limitation, any type of RAM. Each compute node 116 may also include one or more front-end adapters 126 for communicating with the host computer 102. Each compute node $116_1$-$116_4$ may also include one or more back-end adapters 128 for communicating with respective associated back-end drive arrays $130_1$-$130_4$, thereby enabling access to managed drives 132. A given storage system 100 may include one back-end drive array 130 or multiple back-end drive arrays 130.

In some embodiments, managed drives 132 are storage resources dedicated to providing data storage to storage system 100 or are shared between a set of storage systems 100. Managed drives 132 may be implemented using numerous types of memory technologies for example and without limitation any of the SSDs and HDDs mentioned above. In some embodiments the managed drives 132 are implemented using NVM (Non-Volatile Memory) media technologies, such as NAND-based flash, or higher-performing SCM (Storage Class Memory) media technologies such as 3D XPoint and ReRAM (Resistive RAM). Managed drives 132 may be directly connected to the compute nodes $116_1$-$116_4$, using a PCIe (Peripheral Component Interconnect Express) bus or may be connected to the compute nodes $116_1$-$116_4$, for example, by an IB (InfiniBand) bus or fabric.

In some embodiments, each compute node 116 also includes one or more channel adapters 134 for communicating with other compute nodes 116 directly or via an interconnecting fabric 136. An example interconnecting fabric 136 may be implemented using PCIe (Peripheral Component Interconnect Express) or InfiniBand. Each compute node 116 may allocate a portion or partition of its respective local volatile memory 124 to a virtual shared memory 138 that can be accessed by other compute nodes 116 over the PCIe NTB links.

The storage system 100 maintains data for the host applications 104 running on the host computer 102. For example, host application 104 may write data of host application 104 to the storage system 100 and read data of host application 104 from the storage system 100 in order to perform various functions. Examples of host applications 104 may include but are not limited to file servers, email servers, block servers, and databases.

Logical storage devices are created and presented to the host application 104 for storage of the host application 104 data. For example, as shown in FIG. 1, a production device 140 and a corresponding host device 142 are created to enable the storage system 100 to provide storage services to the host application 104.

The host device 142 is a local (to host computer 102) representation of the production device 140. Multiple host devices 142, associated with different host computers 102, may be local representations of the same production device 140. The host device 142 and the production device 140 are abstraction layers between the managed drives 132 and the host application 104. From the perspective of the host application 104, the host device 142 is a single data storage device having a set of contiguous fixed-size LBAs (Logical Block Addresses) on which data used by the host application 104 resides and can be stored. However, the data used by the host application 104 and the storage resources available for use by the host application 104 may actually be maintained by the compute nodes $116_1$-$116_4$ at non-contiguous addresses (tracks) on various different managed drives 132 on storage system 100.

In some embodiments, the storage system 100 maintains metadata that indicates, among various things, mappings between the production device 140 and the locations of extents of host application data in the virtual shared memory 138 and the managed drives 132. In response to an IO (Input/Output command) 146 from the host application 104 to the host device 142, the hypervisor/OS 112 determines whether the IO 146 can be serviced by accessing the host volatile memory 106. If that is not possible, then the IO 146 is sent to one of the compute nodes 116 to be serviced by the storage system 100.

In the case where IO 146 is a read command, the storage system 100 uses metadata to locate the commanded data, e.g., in the virtual shared memory 138 or on managed drives 132. If the commanded data is not in the virtual shared memory 138, then the data is temporarily copied into the virtual shared memory 138 from the managed drives 132 and sent to the host application 104 by the front-end adapter 126 of one of the compute nodes $116_1$-$116_4$. In the case where the IO 146 is a write command, in some embodiments the storage system 100 copies a block being written into the virtual shared memory 138, marks the data as dirty, and creates new metadata that maps the address of the data on the production device 140 to a location to which the block is written on the managed drives 132.

As shown in FIG. 1, in some embodiments the storage system 100 includes a random read miss slot size selection engine 200. Specifically, in some embodiments, the storage system 100 organizes global memory 138 using memory banks, in which different sized slots may be allocated from different memory banks. For write IO operations, since the data that is being written to the storage system doesn't exist elsewhere, the memory banks of global memory are implemented using mirrored slots, such that the data associated with a write IO will be written to two separate mirrored slots of global memory. The slots that are allocated will be the same size, but in different banks of global memory, to provide redundancy for the write IO. For read IO operations, since the data that is being read out to the host is already stored in other storage resources, it is possible to use an unmirrored slot of global memory for the read IO.

Accordingly, the term "mirrored policy region" will be used to refer to a portion of global memory that is being used to implement write IO operations on the storage system, and the term "unmirrored policy region" will be used to refer to a portion of global memory that is being used to implement read IO operations on the storage system. Within each of these policy regions, different memory banks (chunks of memory) may be used to allocate different sized slots of global memory, such that a given slot is allocated to a given read or write IO operation. In some embodiments, each memory bank is on the order of between 128-250 GB, although other sized memory banks may be used as well depending on the particular implementation. In some embodiments, example slot sizes that may be created in global memory described herein include 8 KB, 16 KB, 32 KB, 64 KB, and 128 KB, although the particular slot sizes and selection of two or more slot sizes will depend on the particular implementation.

When a host sends a read IO to the storage system, if the requested data is not already contained in global memory, the storage system will need to allocate a slot of global memory for the read IO. After allocating a slot, the data is read from back-end storage resources 132 into the slot, and the data is then read out to the host. If the data is stored in compressed form in back-end storage resources, the data is decompressed when read into the allocated slot of global memory. In some embodiments, once data has been read into a memory bank of global memory, the data is kept in the memory bank until the slot needs to be allocated to a new read operation. Accordingly, in the event that the data is requested a second time, it is possible that the data might still be held in the allocated slot of global memory, thus resulting in a read hit-a read IO operation where the requested data was already stored in global memory. Read hit IO operations are typically faster to implement because it is not necessary to read the requested data from back-end storage resources and decompress the data before providing the requested data to the host.

Hosts often send read IO operations to the storage system that are not aligned with how data is stored by the storage system. For example, in some embodiments the storage system stores data in back-end tracks of storage resources that have a fixed size, such as 128 KB. The data stored in these allocations may be uncompressed, may be compressed using an in-line compression process that operates on 32 KB sized quarter track chunks of data, or may be compressed using a slower but more efficient compression algorithm that is designed to operate on 128 KB sized (track sized) chunk of data. Accordingly, the amount of data that must be decompressed in connection with a read miss IO will depend on how the data is compressed in back-end storage resources. If the data was subjected to in-line compression prior to being stored, the data is able to be decompressed in chunk sizes of 32 KB. If the data was compressed using the more efficient compression process, which operates at the 128 KB data chunk size, then the entire 128 KB track will need to be decompressed. In instances where the data is not compressed prior to storage in back-end storage resources, it is possible to read the data without consideration of decompression.

The host, however, may often request much smaller pieces of data. For example, an Oracle™ database application may implement data read IO operations having an average size of on the order of between 8-16 KB, whereas another type of database application such as a TeraData™ database application might implement data operations having an average read IO size of on the order of between 23-46 KB. In either case, when the read IO is received by the storage system, if the read IO requests data that is not available in the global memory, and the read IO is on a compressed track of back-end storage resources, the requested data will need to be sent to a decompression engine to be decompressed.

As noted above, in some embodiments the storage system is able to allocate slots of shred global memory that are of different sizes. If a host read IO is received on a track of back-end storage resources that is compressed, conventionally the storage system would decompress the full track, keep the portion of the data that was requested by the host, and discard the rest of the decompressed data that was not requested by the host. In situations where the host subsequently requests a different portion of the same track, the storage system would need to repeat this process thus decompressing the same track multiple times to service different host random read IOs on the same track.

According to some embodiments, a storage system includes a random read miss slot size selection engine 200 that is configured to determine a slot size to be allocated to a random read miss IO operation. By dynamically determining an optimal slot size for the random read miss IO operation, it is possible to allocate slot sizes larger than the requested read operation in particular instances where it is predicted that the host might subsequently issue additional read IO operations on the same back-end track. By intelligently allocating slot sizes that are larger than initially required to implement the read IO operation, it is possible to store more of the decompressed data in global memory, thus increasing the probability that a subsequent read on the same track will result in a random read hit, such that the subsequent read IO is able to be served from previously decompressed data stored in the allocated slot of global memory.

According to some embodiments, a random read miss slot size selection engine 200 is configured to select between multiple memory slot sizes to optimize slot size allocations for random read miss IO operations. Upon receipt of an IO operation that is a random read miss IO operation, the slot size selection engine 200 obtains a metadata page encompassing multiple entries for neighboring tracks in addition to an entry for a track associated with the random read miss IO operation. The slot size selection engine 200 performs a metadata temporal analysis to analyze temporal information associated with previous slot allocations identified in the metadata page. The slot size selection engine 200 also performs a metadata spatial analysis such as collaborative filtering to spatially analyze previous slot allocations to neighboring tracks identified in the metadata page. In response to a determination that the metadata page contains a threshold number of recent slot allocations, the spatial analysis is used to determine the slot size to allocate to the random read miss. Based on the temporal analysis, in response to a determination that the metadata page does not contains a threshold number of recent slot allocations, a size of the read IO is used instead of the spatial analysis to determine a slot size to allocate to the random read miss.

Figure 2:
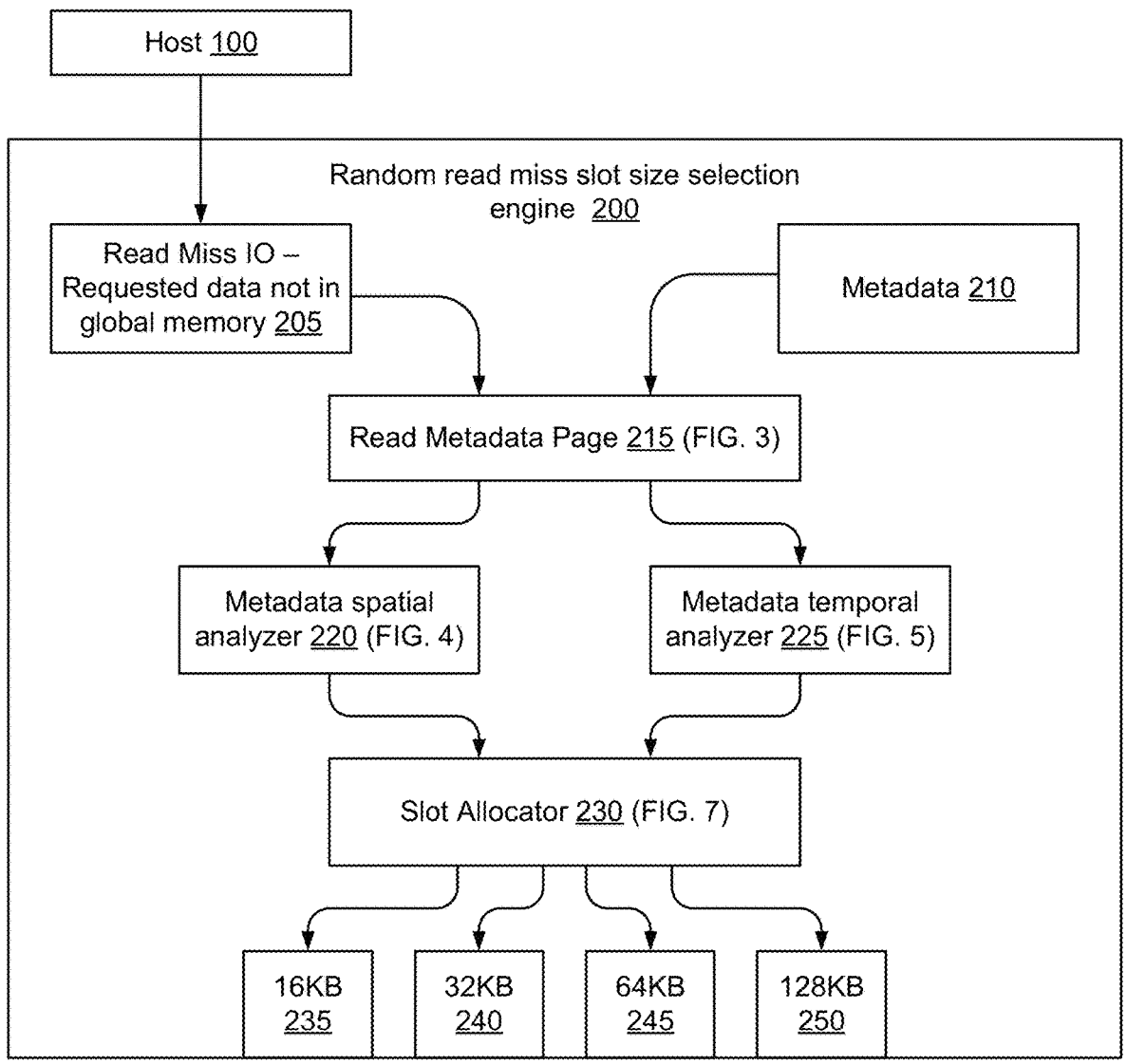
FIG. 2 is a block diagram of an example random read miss slot size selection engine, according to some embodiments.

FIG. 2 is a block diagram of an example random read miss slot size selection engine 200, according to some embodiments. As shown in FIG. 2, when a host 100 submits a read IO to the storage system, if the requested data is not currently contained in a slot of global memory, the read IO is considered a read miss. As used herein, the term "read miss" is used to refer to a read IO from a host that requires the storage system to retrieve the requested data from back-end storage resources 132 rather than from data currently stored in a slot of global memory 138.

In some embodiments, when a read miss 205 is received by the storage system, the read IO 205 is passed to a random read miss slot size selection engine 200. The random read miss slot size selection engine 200 accesses metadata 210 to process the random read miss 205 and retrieves a metadata page 215 incorporating a range of track values encompassing the track to which the random read is directed. A read IO can be directed to a portion of a track or an entire track, depending on the IO. In some embodiments a track of back-end storage resources has a fixed allocation of storage space, such as 128 KB, whereas a read IO can request any amount of data.

Using the retrieved metadata page, the random read miss slot size selection engine 200 implements a metadata spatial analysis using a metadata spatial analyzer 220. An example metadata spatial analysis is described in greater detail in connection with FIG. 4. The random read miss slot size selection engine 200 also implements a metadata temporal analysis using a metadata temporal analyzer 225. An example metadata temporal analysis is described in greater detail in connection with FIG. 5. Based on the outcome of the temporal analysis, a slot allocator 230 either allocates a minimum slot size required to implement the read IO or a slot having a slot size recommended by the metadata spatial analyzer 220. In FIG. 2, example slot sizes are shown as 16 KB, 32 KB, 64 KB, and 128 KB, although the particular slot sizes allocated by the random read miss slot size selection engine 200 will depend on the slot sizes that are available to be allocated in global memory and, hence, will depend on the particular implementation. In some embodiments, the random read miss slot size selection engine 200 allocates slots of global memory that are implemented using at least two physical slot sizes.

Figure 3:
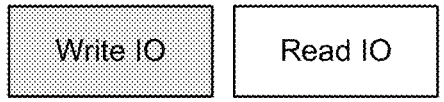
FIG. 3 is a block diagram of an example metadata page, according to some embodiments.

FIG. 3 is a block diagram of an example metadata page, according to some embodiments. As shown in FIG. 3, in some embodiments the metadata page includes a range of Track IDs 305 (TIDs) labeled TID1 305$_1$ through TID42 305$_{42}$ in FIG. 3. It should be understood that the number of TIDs contained in a given metadata page 300 will depend on the particular implementation, and the use of a metadata page with 42 TIDs is simply shown for illustration.

For each TID, the metadata page contains information about slots that were most recently allocated by each of the compute nodes 116 of a pair of storage engines 118. Since all compute nodes 116 of a pair of storage engines 118 are able to allocate a slot of global memory to implement read and write IOs on a given track, in some embodiments a given TID can point to up to four different slots of global memory across various compute nodes, as shown in FIG. 3. Whenever a host sends either a read or write IO to the storage system, the storage system must read the TID to process the read or write IO operation. For convenience, in some embodiments metadata is organized in pages, such as the page shown in FIG. 3, and whenever a host IO is received on a given track, the metadata page encompassing TID for the track is read in connection with processing the IO on that track.

In some embodiments, as described in greater detail below, the size of the slots allocated to other unmirrored (read IO) operations that are contained in the metadata page encompassing the TID of the current read miss IO is used to provide spatial data relative to the current read miss IO. Specifically, in some embodiments each TID contains entries 310 that identify the size of slots 310 allocated to other read IO operations for both the current track and other neighboring tracks—other TIDs contained within the metadata page. This provides spatial data, by providing information about the size of slots in the unmirrored policy region of global memory that were previously allocated to both this TID and to neighboring TIDs. The slot allocations 310 also point to particular slots of global memory which may be accessed to extract timestamps identifying when the slot allocation occurred. Based on these retrieved timestamps, it is possible to implement a temporal analysis to determine whether TIDs contained in the metadata page have been frequently recently accessed or have not been frequently recently accessed.

Figure 4:
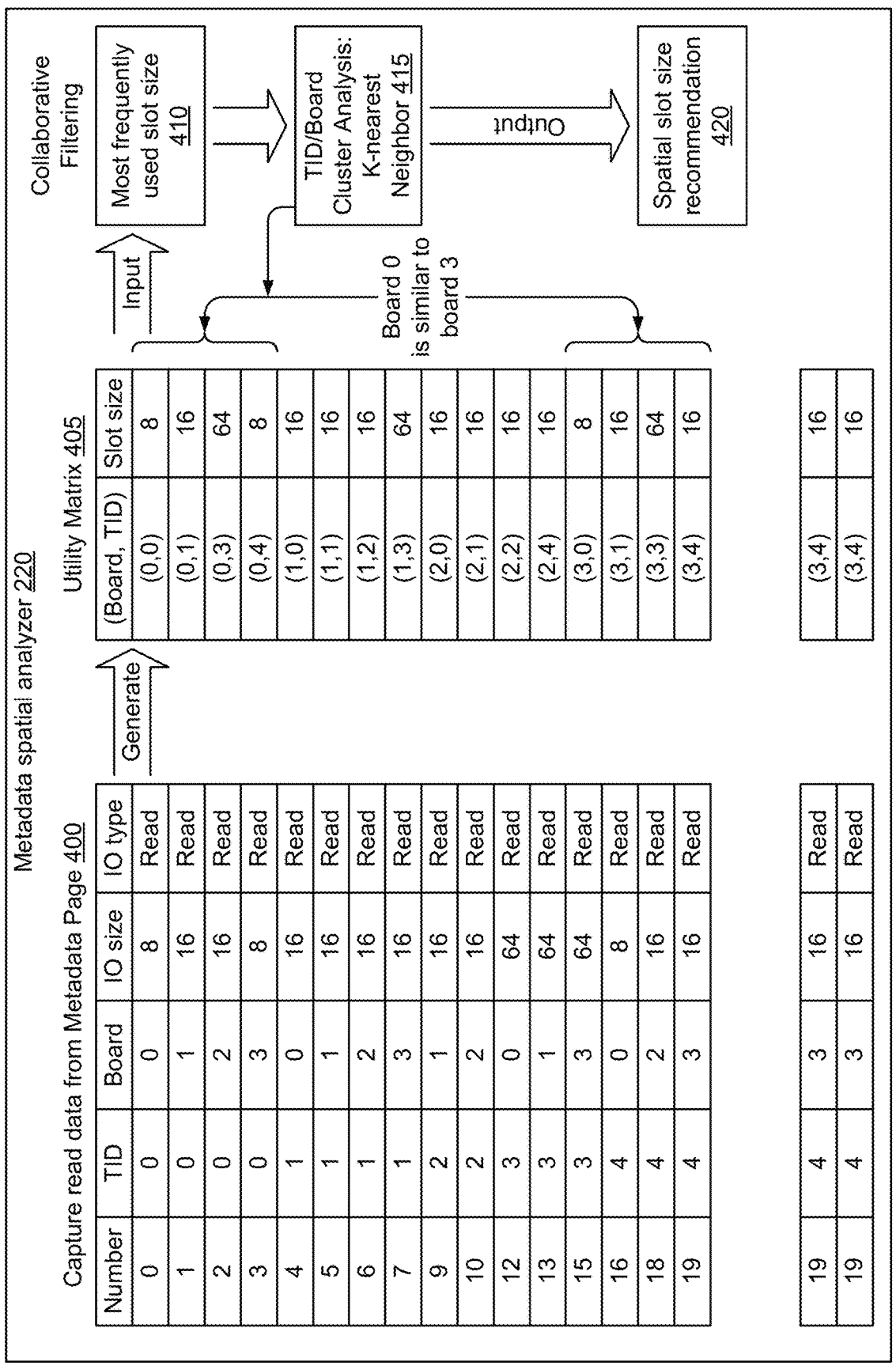
FIG. 4 is a block diagram of a metadata spatial analyzer, according to some embodiments.

FIG. 4 is a block diagram of a metadata spatial analyzer 220, according to some embodiments. As shown in FIG. 4, in some embodiments the metadata spatial analyzer 220 captures read data from the metadata page 400. For example, in the metadata page shown in FIG. 3, some of the entries 310 for some of the TIDs are related to write IO operations. The size of a given write IO operation might have little correlation to the size of a slot that should be allocated to a read IO operation, particularly in environments where read IO sizes are often different than write IO sizes. Accordingly, in some embodiments the metadata spatial analyzer captures the read data from the metadata page and then generates a utility matrix 405 that organizes the data contained in the metadata page according to compute node 116/TID, with each entry of the utility matrix including a corresponding indication of the size of the slot that was allocated to implement the read IO.

FIG. 4 shows a portion of the captured data 400, which in this example was captured from TID1, TID2, TID3, and TID4 of the example metadata page shown in FIG. 3. It should be understood that the captured data includes all slot allocations to read IO operations identified in metadata page 300, and that the sample selection of several entries that is shown in FIG. 4 was shown merely for ease of illustration.

Using the captured data 400, a utility matrix 405 is created, in which the entries of the captured metadata page 400 are reorganized according to compute node and TID, with each entry of the utility matrix 405 showing the size of the slot that was allocated to the read IO by that compute node/TID.

According to some embodiments, the utility matrix is used as input to a collaborative filtering process 410 that is used to determine the most frequently used slot size. Utility matrix is also used as input to a compute node/TID cluster analysis, to determine which compute nodes are most similar based on a K nearest neighbor analysis 415. As shown in FIG. 4, by organizing the slot allocations according to compute node/TID, it is possible to identify boards that have allocated similar slot sizes to read IOs within the range of TIDs contained in the metadata page 300. In instances where all boards have allocated slots to read IOs that are consistent, such that all compute nodes are in the same cluster, then the output of the collaborative filtering 410 is used to implement a spatial slot size recommendation 420. In instances where the boards cluster into two or more clusters, collaborative filtering may be implemented separately on each cluster to determine the spatial slot size recommendation 420.

In some embodiments, the size of the read miss IO is determined, and the collaborative filtering process 410 is used to determine the most frequently allocated slot size for read IO operations reflected in the utility matrix that is created from the metadata page. A comparison is then implemented to determine if the most frequently allocated slot size for the read IO operations is larger than the size of the read miss IO. In response to a determination that the most frequently allocated slot size is larger than the size of the read miss IO, the spatial slot size allocation is the output of the collaborative filtering process. In response to a determination that the most frequently allocated slot size is smaller than the size of the read miss IO, the spatial slot size allocation recommendation is the minimum slot size that is large enough to accommodate the read miss IO.

For example, in the portion of the utility matrix 405 shown in FIG. 4, slots having an 8 KB slot size were allocated 3 times, slots having a 16 KB slot size were allocated 10 times, and slots having a 64 KB slot size were allocated 3 times. If a read IO is received that has a size of 6 KB, the output of the collaborative filtering process 410 is that the most frequently allocated slot size is 16 KB. Accordingly, since the 6 KB read IO will fit within a 16 KB slot, the output of the spatial slot size recommendation 420 is that a slot having a slot size of 16 KB should be allocated to implement the read IO. By contrast, if the read IO had a size of 20 KB, which is greater than the 16K slot size determined by the collaborative filtering process 410, a slot having a next larger slot size will be allocated which, in this instance would be a slot having a slot size of 64 KB.

Figure 5:
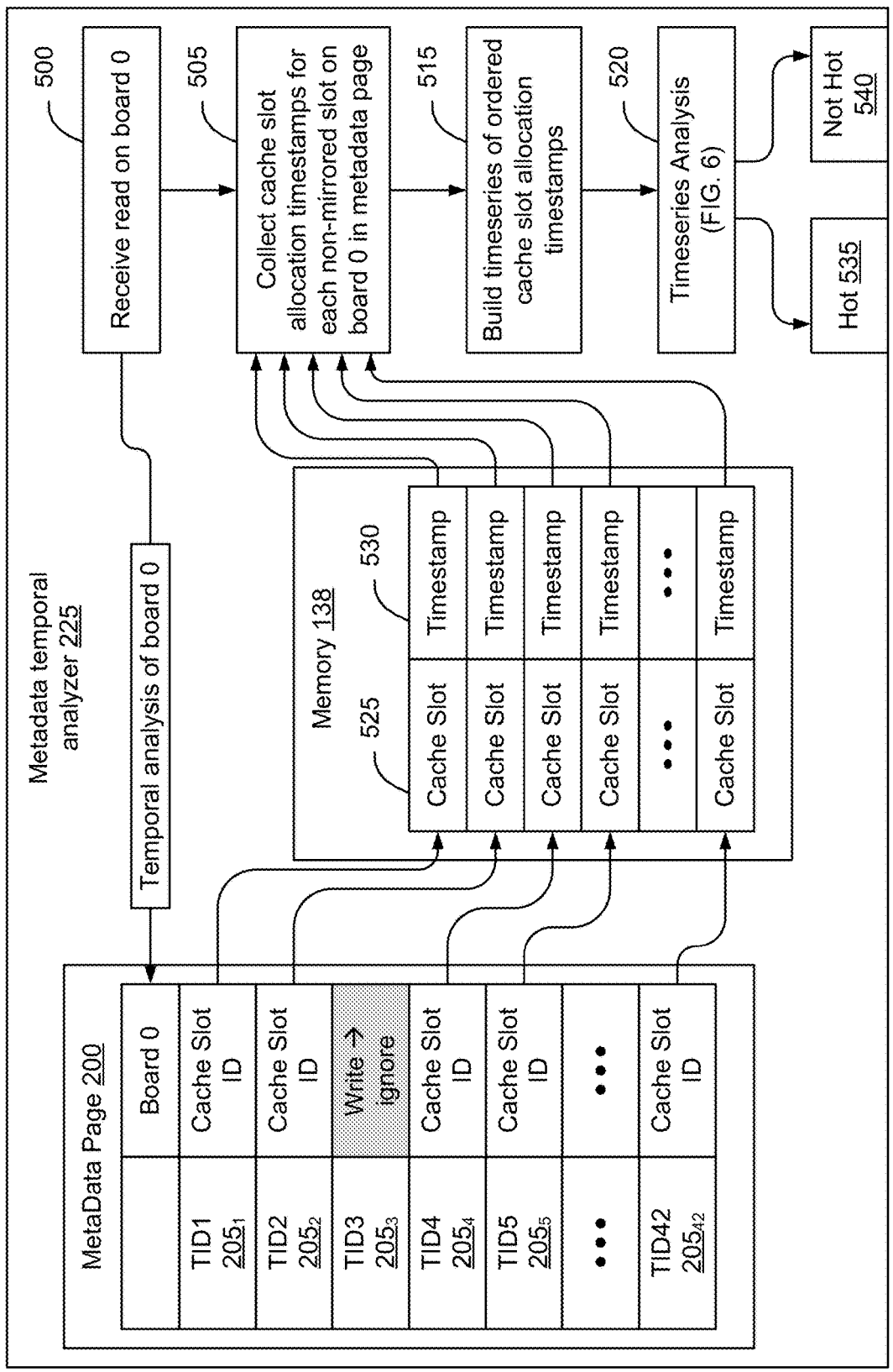
FIG. 5 is a block diagram of a metadata temporal analyzer, according to some embodiments.

FIG. 5 is a block diagram of a metadata temporal analyzer, according to some embodiments. As shown in FIG. 5, in some embodiments when a metadata page is retrieved, the metadata page identifies the slots of global memory that were most recently allocated to a given TID by each of the compute nodes 116. Compute nodes are also referred to herein as "boards". The metadata page does not, however, contain a timestamp or other information about when the slot was allocated by the compute node to the TID. The metadata page has a reference to the slot of global memory, and the slot has metadata that includes a timestamp. If the reference to the slot contained in the metadata page is still valid, it is therefore possible to access the slot of global memory to determine the timestamp associated with the slot allocation for the TID.

When a read miss IO arrives on a given compute node, it is possible for the metadata temporal analyzer 225 on the compute node to access slots on all of the compute nodes. However, doing so is computationally expensive. According to some embodiments, the metadata temporal analyzer retrieves the metadata page and identifies all non-mirrored slots that were used to implement read IOs that were local to the board. For example, in FIG. 5 an example is shown in which the read IO operation occurs on board 0 (block 500). The metadata temporal analyzer 225 on board 0 thus does a temporal analysis of board 0 by identifying all slots of global memory 138 that were allocated by board 0 that are identified in the metadata page. The metadata temporal analyzer 225 accesses each identified slot of global memory to read the timestamp when the slot was allocated to the TID. In instances where the slot has been subsequently allocated to another TID the linkage to the slot contained in the metadata page will be broken, and hence the time stamp for that previous slot allocation will be unavailable. In this manner, the metadata temporal analyzer 225 collects slot allocation timestamps for each non-mirrored (read) slot on board 0 that is identified in the metadata page (block 505).

The metadata temporal analyzer 225 uses the timestamps to build a timeseries of ordered slot allocation timestamps (block 515), and uses the timeseries in a timeseries analysis (block 520). An example timeseries analysis is described in greater detail in connection with FIG. 6. Based on the timeseries analysis, the metadata temporal analyzer 225 determines whether the metadata page contains "hot" metadata (block 535) or "not hot" metadata (block 540). As used herein, the term "hot" metadata is used to refer to metadata that identifies read operations that have occurred recently, such as within the past four hours, whereas "not hot" metadata is used to refer to metadata that identifies read operations that have not occurred recently, such as read operations that have not occurred in the past four hours.

If the metadata page contains slot allocation information that is very old, the data associated with the page has not been frequently recently accessed and hence is unlikely to be accessed again soon. Accordingly, in instances where the metadata page contains metadata that is not hot, it would be desirable to allocate a minimum amount of space in global memory to the read operation and, accordingly, the random read miss slot size allocation engine 200 will allocate a slot that is sufficiently large to hold the requested data only, e.g., if slots with sizes of 8 KB and 16 KB are available, the slot size allocation engine 200 would allocate an 8 KB slot for an 8 KB read IO, and a 16 KB slot for a 10 KB read.

If the metadata page contains slot allocation information that is sufficiently new, there is a possibility that the host might want to access other data on the same track again in the upcoming future. If a slot size larger than the minimum slot size required is allocated to the read miss IO, additional decompressed data from the track may be stored in global memory rather than being discarded, which might result in a read hit in the event the host issues a subsequent read on a different part of the track. Accordingly, in instances where the metadata contained in the metadata page is determined to be hot, in some embodiments the random read miss slot size selection engine 200 is configured to allocate a slot from global memory that is based on the output of the metadata spatial analyzer 220.

Figure 6:
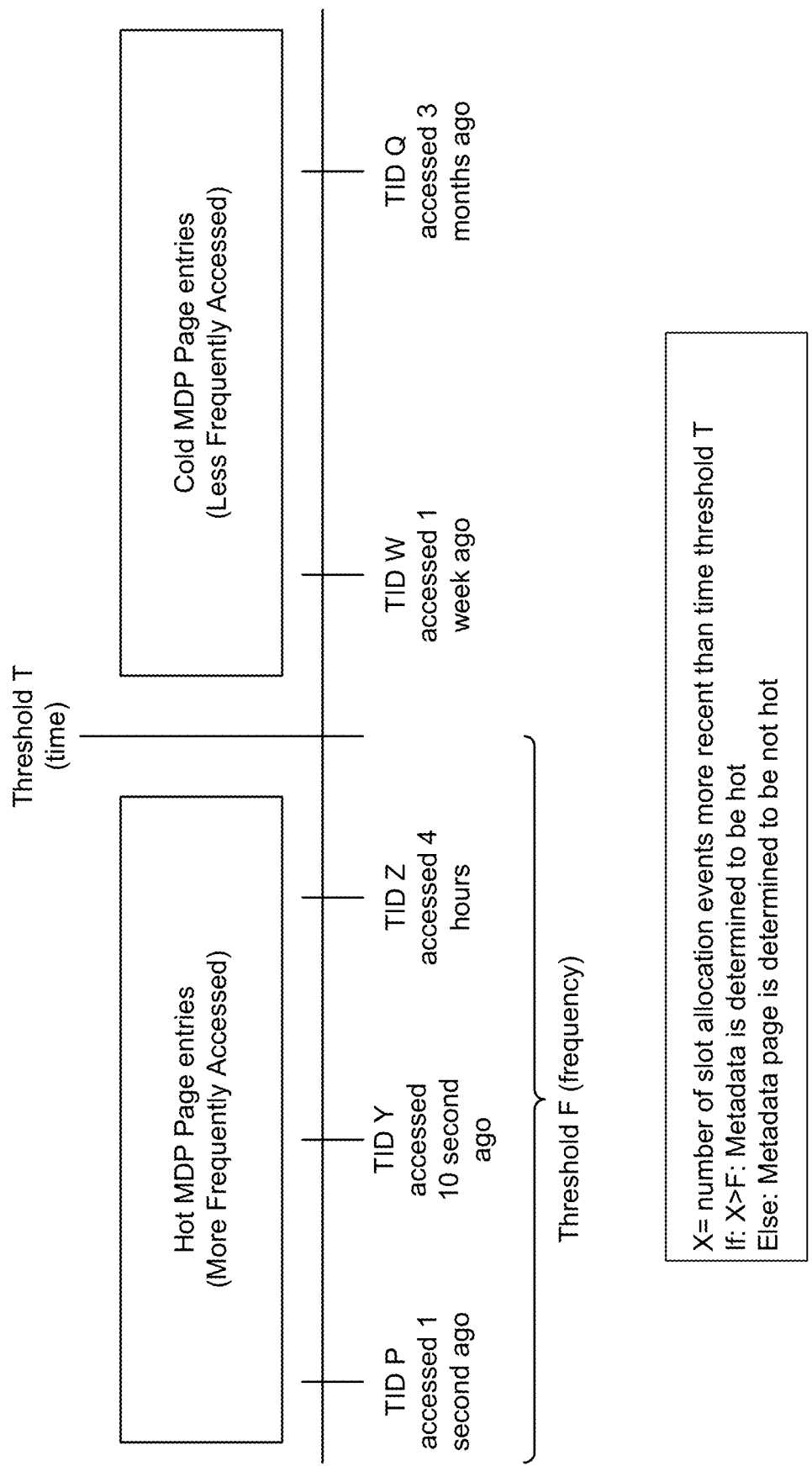
FIG. 6 is a timeline illustrating an example metadata temporal analysis process, according to some embodiments.

FIG. 6 is a timeline illustrating an example metadata timeseries analysis process, according to some embodiments. In particular, FIG. 6 shows an example timeseries analysis that may be implemented by the metadata temporal analyzer 225 in block 520 of FIG. 5 in greater detail. In some embodiments, the determination of whether the metadata contained in the metadata page is hot is implemented using two thresholds. As shown in FIG. 6, in some embodiments the first threshold is a time threshold T, which is used to determine how many slot allocations occurred before the selected time threshold T and how many slot allocations occurred after the selected time threshold T. A second threshold is a numerical threshold F.

In some embodiments, the combination of the two thresholds is used to determine whether the metadata is considered "hot". Specifically, if more than F slot allocations occurred more recently than the time threshold T, the metadata page is considered to contain "hot" metadata (block 535). If fewer than F slot allocations occurred more recently than the time threshold T, the metadata page is considered to contain "not hot" metadata (block 540).

In the example shown in FIG. 6, an example time threshold T is shown as being set to four hours. Any slot allocation that occurred more recently than four hours ago would be considered recent, for purposes of the temporal analysis. The numerical threshold F sets a percentage or numerical threshold of slot allocation events that must have occurred more recently than the time threshold T for the metadata to be considered hot. For example, if the numerical threshold T is set to T=2, two slot allocation events identified in the metadata page must have occurred within the past four hours for the metadata page to be considered as "hot". If fewer than two slot allocation events identified in the metadata page have occurred within the past four hours, the metadata page will be considered "not hot".

The time threshold T and the numerical threshold F may be varied depending on the particular embodiment. For example, a threshold F=1 may be used such that if a slot allocation event has occurred in connection with a read IO on one of the TIDs of the metadata page more recently than the selected time threshold, the metadata page will be considered hot.

Likewise, multiple combinations of time thresholds and numerical thresholds may be used, depending on the implementation. For example, two combinations of time T and frequency F may be used to determine whether the metadata page is hot. For example, a given timeseries analysis may apply a first time threshold (e.g., T1=1 hour) that is combined with a first frequency threshold (e.g., F1=1 slot allocation) to determine whether a metadata page is hot, such that if there is a single slot allocation event occurred within the previous one hour, the metadata page will be considered hot. Additionally, the given timeseries analysis may also apply a second time threshold (e.g., T2-4 hours) that is combined with a second frequency threshold (e.g., F2=3 slot allocations) to determine whether a metadata page is hot, such that if there are at least three slot allocation events within the previous four hours, the metadata page will be considered hot.

While some embodiments have been described in which the frequency threshold F is described as an absolute number, it should be understood that other ways of measuring frequency such as % of read operations might be utilized as well. For example, if the frequency threshold F is set as a percentage value, a metadata page may be considered to be hot if F % of the slot allocation events identified in the metadata of the metadata page occurred more recently than the given time threshold T.

Figure 7:
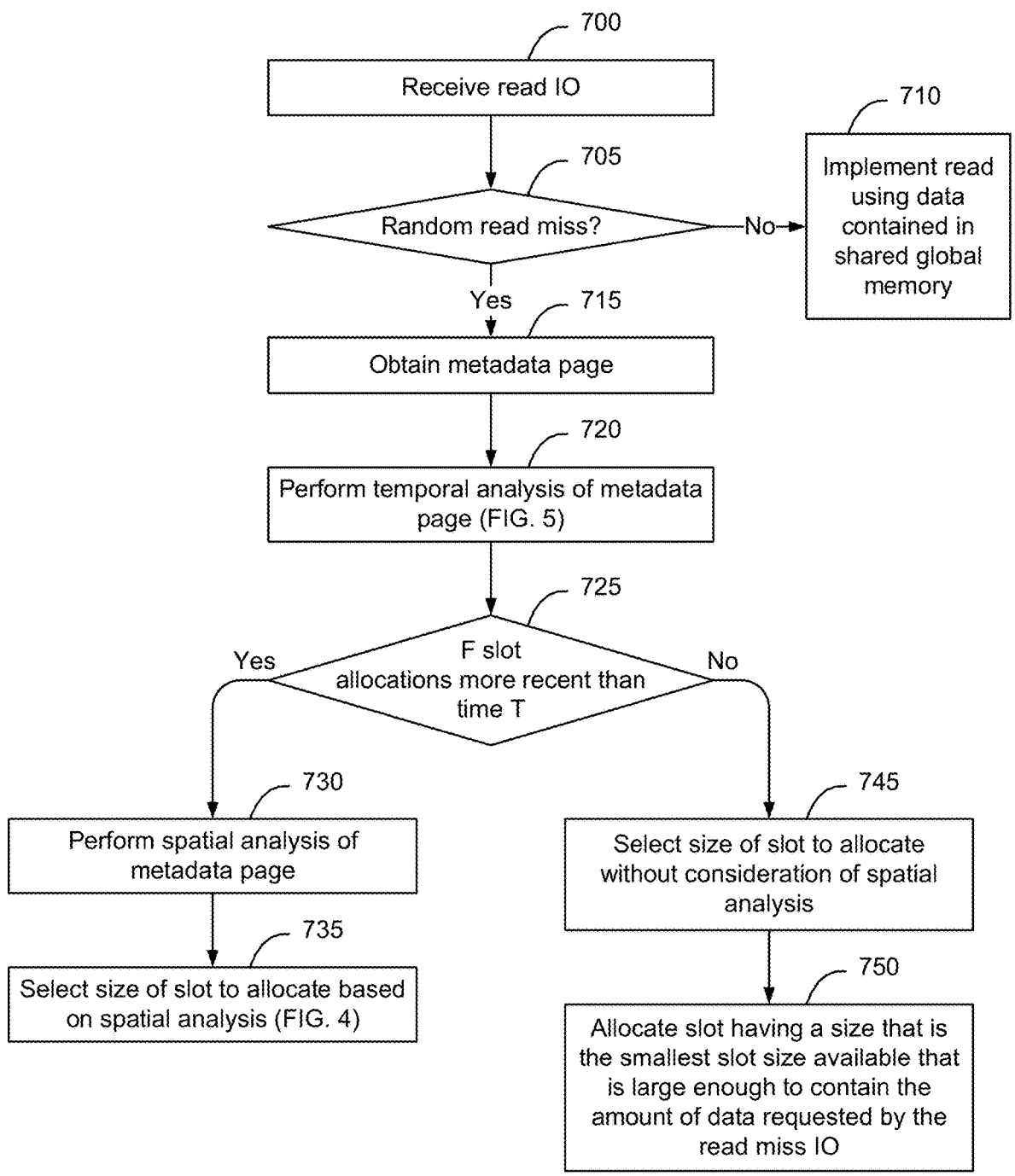
FIG. 7 is a flow chart of an example process implemented by a slot allocator to select between multiple memory slot sizes to optimize slot size allocations for random read miss IO operations, according to some embodiments.

FIG. 7 is a flow chart of an example process of selecting between multiple memory slot sizes to optimize slot size allocations for random read miss IO operations, according to some embodiments. As shown in FIG. 7, when a read O is received (block 700) a determination is made as to whether the read is for data that is contained in global memory (block 705). If the read requests data that is already contained in a slot of global memory, the read is a read hit (a determination of NO at block 705), a new slot does not need to allocated to the read IO, and the read IO is implemented using the data already contained in global memory (block 710).

If the read requests data that is not already contained in a slot of global memory, the read is a read miss (a determination of YES at block 705), and a new slot of global memory will need to allocated to implement the read IO.

In some embodiments, to determine the size of the slot of global memory that should be allocated to the read IO, the random read miss slot size selection engine 200 obtains a metadata page including the TID of the read miss IO (block 715). The random read miss slot size selection engine 200 uses the metadata page to perform a temporal analysis of the metadata page, for example using the metadata temporal analyzer described in connection with FIG. 5 (block 720).

Based on the temporal analysis, a determination is then made as to whether the metadata contained in the metadata page is hot or not hot (block 725). In some embodiments a determination as to whether the metadata contained in the metadata page is hot or not hot is implemented by determining whether there have been a threshold F number of slot allocation events more recently than a threshold time T. In response to a determination that a threshold F number of slot allocation events were implemented more recently than a threshold time T (a determination of YES at block 725), a spatial analysis is implemented on the metadata page (block 730) and the slot size for the read miss IO is determined based on the result of the spatial analysis (block 735). Additional details associated with implementation of a spatial analysis on the metadata page are described herein, for example in connection with FIG. 4. In response to a determination that fewer than a threshold F number of slot allocation events were implemented more recently than a threshold time T (a determination of NO at block 725), a spatial analysis is not required and the slot size for the read miss IO is determined without consideration of the metadata spatial analysis (block 745). In some embodiments, the size of the slot that is allocated is the smallest slot size available that is large enough to contain the amount of data requested by the read miss IO (block 750)

It is possible to simultaneously implement the temporal metadata analysis (block 725) and spatial metadata analysis (block 730) for all read miss IO operations and not consider the result of the spatial metadata analysis (block 745) in instances where the temporal metadata analysis results in a determination that the metadata contained in the metadata page is not hot (a determination of NO at block 725). Alternatively, as shown in FIG. 7, it is also possible to serially implement the temporal metadata analysis (block 725) and spatial metadata analysis (block 730), and to not implement the spatial metadata analysis (block 730) in instances where the temporal metadata analysis results in a determination that the metadata contained in the metadata page is not hot (a determination of NO at block 725).

In some embodiments, when selecting the slot size of global memory to allocate to a read miss IO, a determination is made as to whether the requested data is compressed in back-end storage resources. In response to a determination that the requested data is not compressed a slot size is selected that is a minimum available slot size that is adequate to contain the amount of data requested by the read miss IO.

The methods described herein may be implemented as software configured to be executed in control logic such as contained in a CPU (Central Processing Unit) or GPU (Graphics Processing Unit) of an electronic device such as a computer. In particular, the functions described herein may be implemented as sets of program instructions stored on a non-transitory tangible computer readable storage medium. The program instructions may be implemented utilizing programming techniques known to those of ordinary skill in the art. Program instructions may be stored in a computer readable memory within the computer or loaded onto the computer and executed on computer's microprocessor. However, it will be apparent to a skilled artisan that all logic described herein can be embodied using discrete components, integrated circuitry, programmable logic used in conjunction with a programmable logic device such as a FPGA (Field Programmable Gate Array) or microprocessor, or any other device including any combination thereof. Programmable logic can be fixed temporarily or permanently in a tangible non-transitory computer readable medium such as random-access memory, a computer memory, a disk drive, or other storage medium. All such embodiments are intended to fall within the scope of the present invention.

Throughout the entirety of the present disclosure, use of the articles "a" or "an" to modify a noun may be understood to be used for convenience and to include one, or more than one of the modified noun, unless otherwise specifically stated. The term "about" is used to indicate that a value includes the standard level of error for the device or method being employed to determine the value. The use of the term "or" in the claims is used to mean "and/or" unless explicitly indicated to refer to alternatives only or the alternatives are mutually exclusive, although the disclosure supports a definition that refers to only alternatives and to "and/or." The terms "comprise," "have" and "include" are open-ended linking verbs. Any forms or tenses of one or more of these verbs, such as "comprises," "comprising," "has," "having," "includes" and "including," are also open-ended. For example, any method that "comprises," "has" or "includes" one or more steps is not limited to possessing only those one or more steps and also covers other unlisted steps.

Elements, components, modules, and/or parts thereof that are described and/or otherwise portrayed through the figures to communicate with, be associated with, and/or be based on, something else, may be understood to so communicate, be associated with, and or be based on in a direct and/or indirect manner, unless otherwise stipulated herein.

Various changes and modifications of the embodiments shown in the drawings and described in the specification may be made within the spirit and scope of the present invention. Accordingly, it is intended that all matter contained in the above description and shown in the accompanying drawings be interpreted in an illustrative and not in a limiting sense. The invention is limited only as defined in the following claims and the equivalents thereto.

What is claimed is:

1. A method of selecting between multiple memory slot sizes of global memory for random read miss Input/Output (IO) operations, comprising:
   receiving an IO operation on a first track of storage;
   determining that the IO operation is a random read miss IO operation, in which data requested in connection with the IO operation is not currently contained in an allocated slot of the global memory;
   retrieving a metadata page containing metadata, the metadata identifying previous slot allocations for read IO operations on a range of tracks of storage, the range of tracks of storage including the first track of storage;
   performing a spatial metadata analysis on the metadata contained in the metadata page to generate a slot size recommendation; and
   performing a temporal metadata analysis on the metadata contained in the metadata page to determine if the metadata contained in the metadata page is hot;
   in response to a determination that the metadata contained in the metadata page is hot, allocating a slot to the received IO operation based on the slot size recommendation determined by the spatial metadata analysis; and
   in response to a determination that the metadata contained in the metadata page is not hot, allocating the slot to the received IO operation based on a size of data requested by the received IO operation.

2. The method of claim 1, wherein the range of tracks of storage is a continuous range of tracks of physical storage.

3. The method of claim 1, wherein the range of tracks of storage is a group of tracks of physical storage corresponding to a range of tracks of a logical storage volume.

4. The method of claim 1, wherein the metadata page further includes information identifying previous slot allocations for write IO operations on the range of tracks of storage; and
   wherein the spatial metadata analysis comprises creating a utility matrix from the metadata page, the utility matrix including entries only for the slot allocations associated with the read IO operations and does not include entries for slot allocations for the write IO operations.

5. The method of claim 4, wherein each entry of the utility matrix includes a track ID of a corresponding track and a slot size indication identifying a size of a slot that was allocated to implement the read IO on the corresponding track.

6. The method of claim 5, wherein the spatial metadata analysis further comprises implementing a collaborative filtering process on the utility matrix to identify a most frequently used slot size.

7. The method of claim 6, wherein the slot size recommendation determined by the spatial metadata analysis is the larger of a size of the read IO operation or the most frequently used slot size determined by the collaborative filtering process.

8. The method of claim 1, wherein the spatial metadata analysis is implemented in response to a determination that the metadata contained in the metadata page is hot.

9. The method of claim 1, wherein the temporal metadata analysis comprises obtaining timestamps from the global memory for a plurality of slots identified in the metadata page that were used to implement read IO operations, and comparing the timestamps with a temporal threshold and a frequency threshold to determine if the metadata contained in the metadata page is hot.

10. The method of claim 9, wherein the temporal threshold specifies a preceding point in time relative to a current time, and wherein the frequency threshold specifies a number of timestamps that are required to be more recent than the temporal threshold for the metadata contained in the metadata page to be deemed to be hot.

11. A random read miss slot size selection engine, comprising:
    one or more processors and one or more storage devices storing instructions that are operable, when executed by the one or more processors, to cause the one or more processors to perform operations comprising:
    receiving an Input/Output (IO) operation on a first track of storage;
    determining that the IO operation is a random read miss IO operation, in which data requested in connection with the IO operation is not currently contained in an allocated slot of the global memory;
    retrieving a metadata page containing metadata, the metadata identifying previous slot allocations for read IO operations on a range of tracks of storage, the range of tracks of storage including the first track of storage;
    performing a spatial metadata analysis on the metadata contained in the metadata page to generate a slot size recommendation; and
    performing a temporal metadata analysis on the metadata contained in the metadata page to determine if the metadata contained in the metadata page is hot;
    in response to a determination that the metadata contained in the metadata page is hot, allocating a slot to the received IO operation based on the slot size recommendation determined by the spatial metadata analysis; and
    in response to a determination that the metadata contained in the metadata page is not hot, allocating the slot to the received IO operation based on a size of data requested by the received IO operation.

12. The random read miss slot size selection engine of claim 11, wherein the range of tracks of storage is a continuous range of tracks of physical storage.

13. The random read miss slot size selection engine of claim 11, wherein the range of tracks of storage is a group of tracks of physical storage corresponding to a range of tracks of a logical storage volume.

14. The random read miss slot size selection engine of claim 11, wherein the metadata page further includes information identifying previous slot allocations for write IO operations on the range of tracks of storage; and wherein the spatial metadata analysis comprises creating a utility matrix from the metadata page, the utility matrix including entries only for the slot allocations associated with the read IO operations and does not include entries for slot allocations for the write IO operations.

15. The random read miss slot size selection engine of claim 14, wherein each entry of the utility matrix includes a track ID of a corresponding track and a slot size indication identifying a size of a slot that was allocated to implement the read IO on the corresponding track.

16. The random read miss slot size selection engine of claim 15, wherein the spatial metadata analysis further comprises implementing a collaborative filtering process on the utility matrix to identify a most frequently used slot size.

17. The random read miss slot size selection engine of claim 16, wherein the slot size recommendation determined by the spatial metadata analysis is the larger of a size of the read IO operation or the most frequently used slot size determined by the collaborative filtering process.

18. The random read miss slot size selection engine of claim 11, wherein the spatial metadata analysis is implemented in response to a determination that the metadata contained in the metadata page is hot.

19. The random read miss slot size selection engine of claim 11, wherein the temporal metadata analysis comprises obtaining timestamps from the global memory for a plurality of slots identified in the metadata page that were used to implement read IO operations, and comparing the timestamps with a temporal threshold and a frequency threshold to determine if the metadata contained in the metadata page is hot.

20. The random read miss slot size selection engine of claim 19, wherein the temporal threshold specifies a preceding point in time relative to a current time, and wherein the frequency threshold specifies a number of timestamps that are required to be more recent than the temporal threshold for the metadata contained in the metadata page to be deemed to be hot.

\* \* \* \* \*